E. W. BUFFINTON.
OUTLET BOX.
APPLICATION FILED OCT. 7, 1912.
1,081,947.
Patented Dec. 23, 1913.
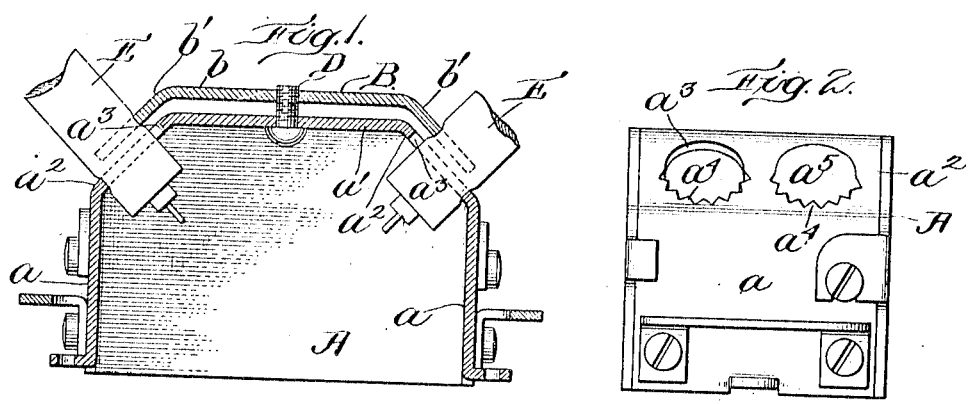
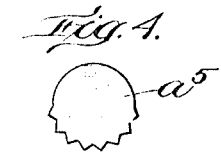
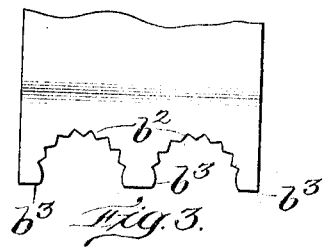
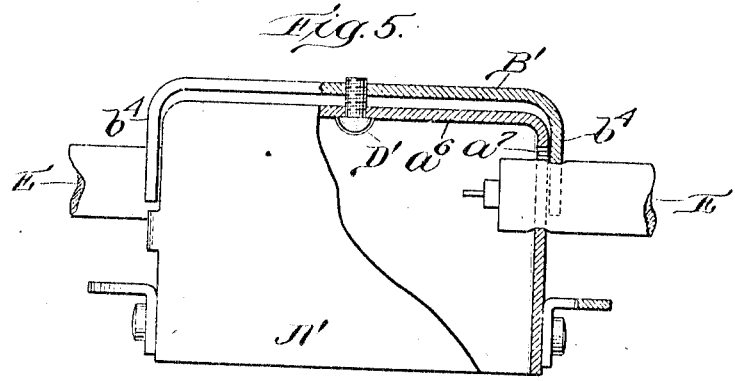
Witnesses:
Ida A. Eichorn.
Agnes M. Shea.
Inventor:
Elisha W. Buffinton
by George A. Rockwell,
Atty.

UNITED STATES PATENT OFFICE.

ELISHA W. BUFFINTON, OF FALL RIVER, MASSACHUSETTS.

OUTLET-BOX.

1,081,947.

Specification of Letters Patent. Patented Dec. 23, 1913.

Application filed October 7, 1912. Serial No. 724,241.

*To all whom it may concern:*

Be it known that I, ELISHA W. BUFFINTON, of Fall River, in the county of Bristol and State of Massachusetts, have invented a new and useful Outlet-Box, of which the following is a specification.

I have found that much trouble arises in the use of outlet boxes by reason of slipping of the conduits with relation to the box so that short-circuits and arcing of the current result and the main object of my invention is to provide simple but efficient clamping means to hold the conduit or conduits in the opening or openings in the box.

My invention consists mainly in a bodily movable clamping member to coöperate with a portion of an opening to grip a conduit.

A feature of my invention is a rigid member having bodily movement only and another feature is a single screw for moving as well as holding the movable member.

Another feature is a movable member in combination with an opening in a wall which is at an angle with the direction of movement of said member.

Other features will be pointed out below.

In the drawings: Figure 1 is a vertical section of a box embodying my invention; Fig. 2 is an end elevation thereof without the movable member; Fig. 3 is a partial plan of the movable member; Fig. 4 is a plan of one of the knock-out portions; and Fig. 5 is an elevation partly in section of another form of box embodying my invention.

The box A may be constructed at its open end in any suitable way to support a switch. It has side walls $a$ $a$, base $a'$ and portions $a^2$ $a^2$ at an angle with the base. Knock-out outlets or openings $a^3$ $a^3$ are provided and these may have teeth as indicated at $a^4$, one knock-out portion closing its opening being indicated at $a^5$. Member B is a rigid piece of metal having a flat main portion $b$ and angle portions $b'$ $b'$, the latter being parallel to the portions $a^2$ $a^2$ of the box proper. The portions $b'$ $b'$, have semi-circular portions $b^2$ $b^2$, preferably provided with teeth, and prongs or guides $b^3$ $b^3$ $b^3$ to guide member B in its movement. Member B is mounted externally on the box by means of screw D which not only moves said member but connects it to the box and this single screw will therefore operate the movable jaw of the clamp for all the openings or outlets.

In using my device the workman turns the screw so that member B is at a distance from the box and then inserts a conduit in the opening. He then turns the screw to move member B toward the box it being clear that said member has bodily movement toward the box, this movement resulting because the conduits prevent turning of member B by engaging prongs $b^3$ and the turning is also prevented by the walls which are at an angle with the base, and the teeth of portion $b^2$ move not only toward the box but toward the teeth $a^4$ or clamping portion of opening $a^3$ and when member B has been moved sufficiently toward the box the conduits E are clamped firmly and positively in position.

In the form shown in Fig. 5 the box has side walls at right angles to the base $a'$ and the openings $a^3$ in these walls are provided. Member B' is like member B except that its ends $b^4$ are parallel with the side walls so that movement of screw D' may draw member B' toward the box and therefore grip conduits E E in their openings by bodily movement of member B'.

Among the advantages of my device I may point out that it is very simple and compact and yet highly efficient; that it is useful for metallic as well as flexible conduits; that it is very inexpensive; that it is of great utility for outlets in portions at an angle with the base of the box whether the openings are in the angle portions described or in the side walls proper which are of course at an angle with said base portion; and that the movable member is firmly held against turning by the box itself when the conduit is clamped in position.

What I claim is:

1. An outlet box having a base and a wall with an opening adapted to receive a conduit, said wall being at an angle to said base; a member movably mounted on the base and having a portion which is substantially parallel with said wall and which is adapted to engage said conduit; and means to impart to said member combined movement along said wall and toward said wall to direct said engaging portion partly across said opening and thereby grip a conduit in said opening.

2. An outlet box having a base and two walls, each at an angle with said base and each having an opening adapted to receive a conduit; a member mounted on the outside of the base and having a portion substantially parallel with the base, a second portion substantially parallel with one of said walls and adapted to engage a conduit in the opening in the last-mentioned wall and a third portion substantially parallel with the other of said walls and adapted to engage a conduit in the opening in said other wall; and a single screw to move said member toward the box and carry said engaging portions partially across the respective openings and thereby grip the conduits in said openings.

ELISHA W. BUFFINTON.

Witnesses:
GEO. N. GODDARD,
GEORGE A. ROCKWELL.